Oct. 5, 1937.  E. E. W. KASSNER  2,094,602
APPARATUS FOR THE GENERATION OF SHORT ELECTROMAGNETIC WAVES
Filed Sept. 15, 1934  10 Sheets-Sheet 1
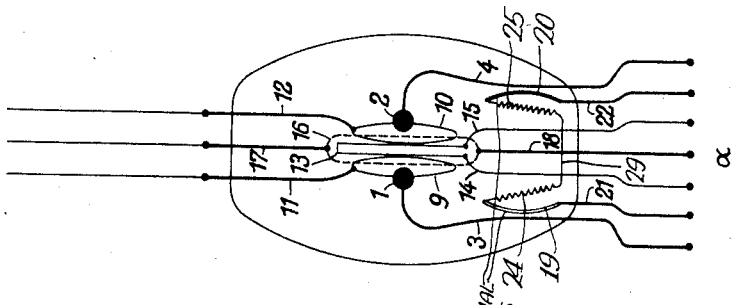
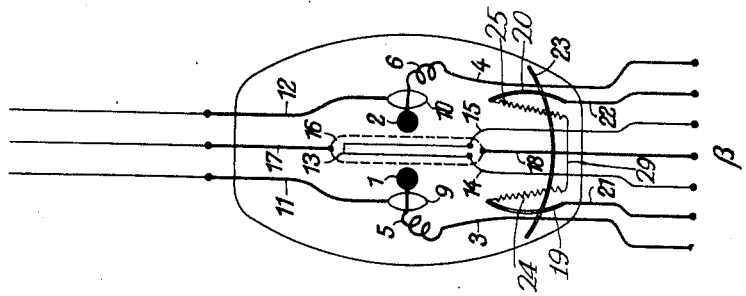
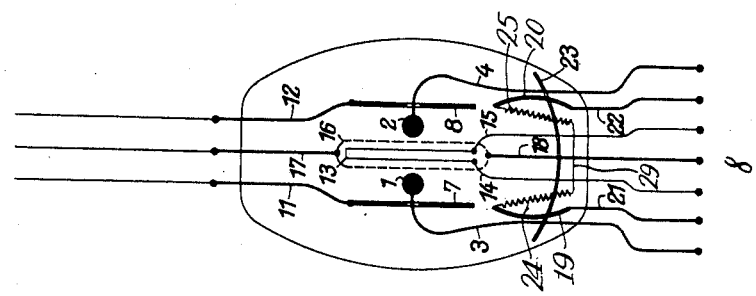
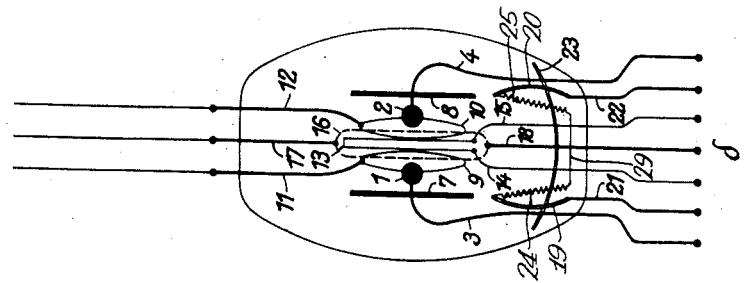
Inventor:

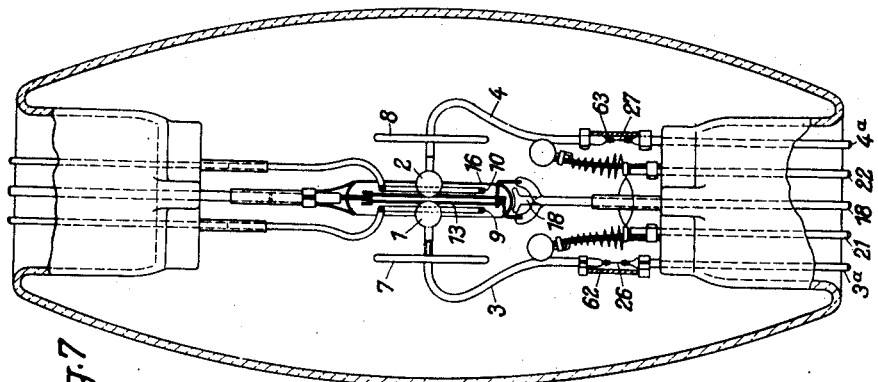

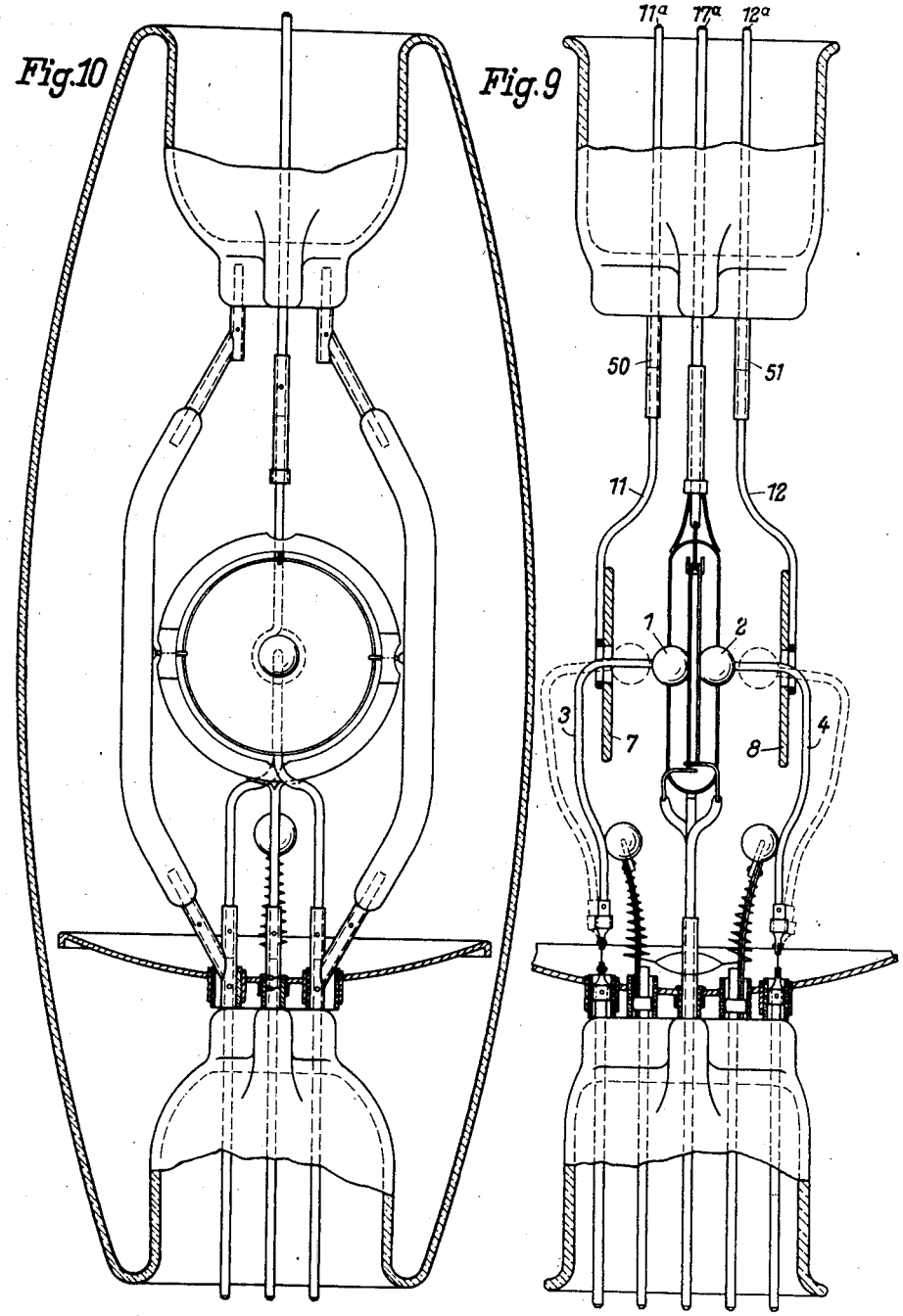

Oct. 5, 1937.  E. E. W. KASSNER  2,094,602
APPARATUS FOR THE GENERATION OF SHORT ELECTROMAGNETIC WAVES
Filed Sept. 15, 1934   10 Sheets-Sheet 4
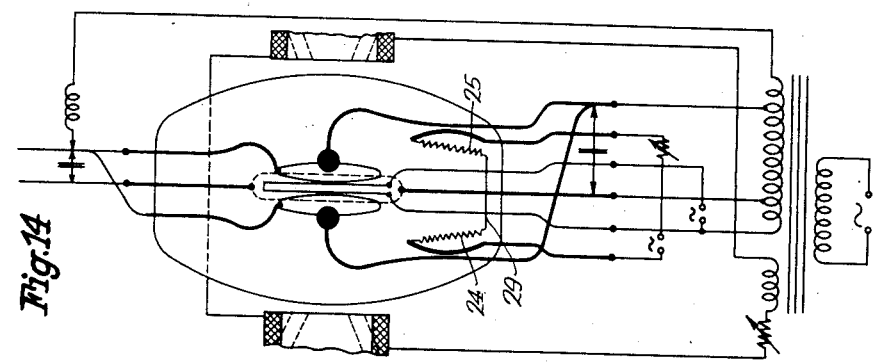
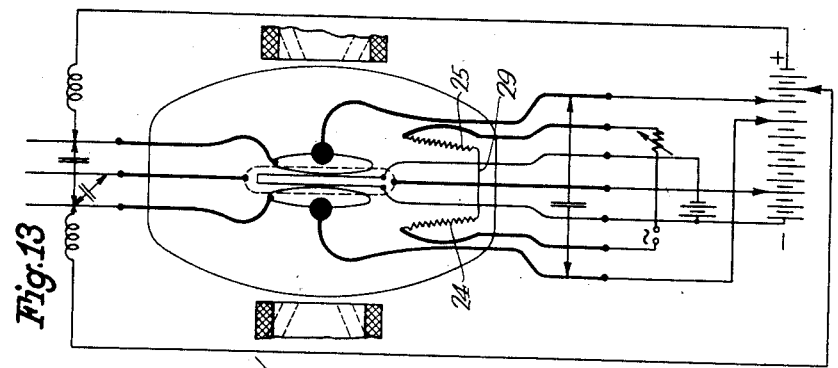
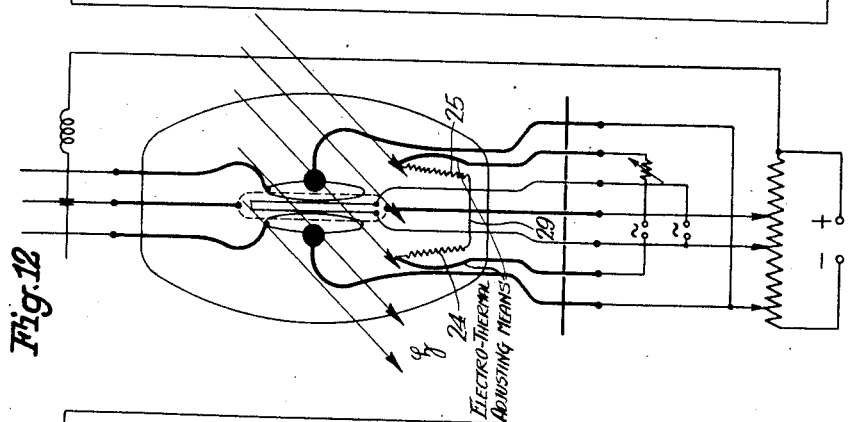
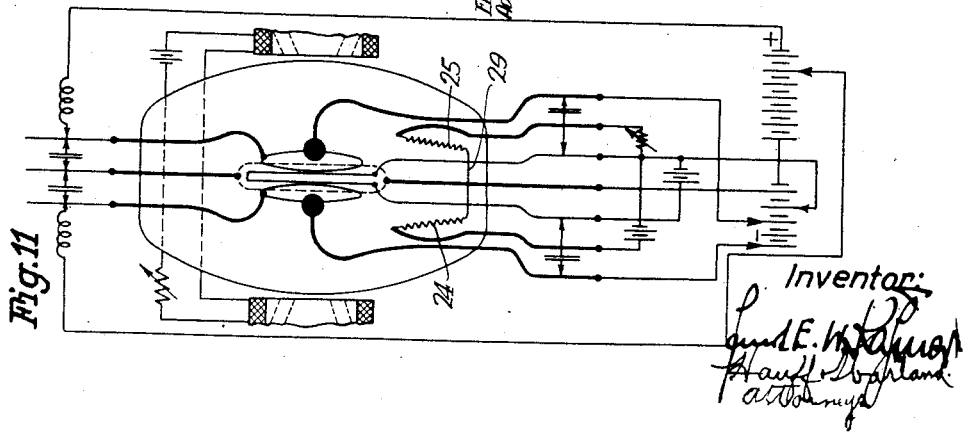

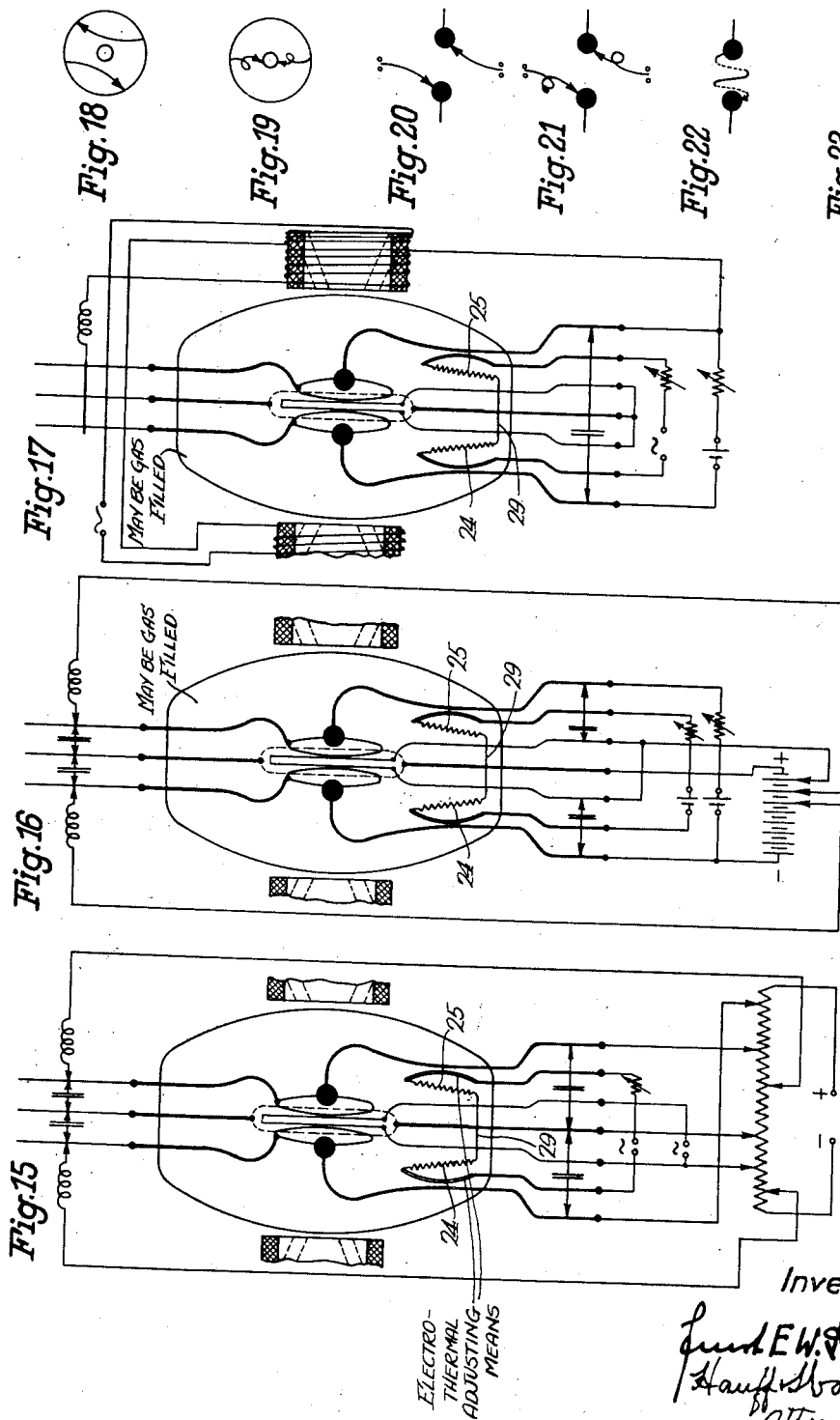

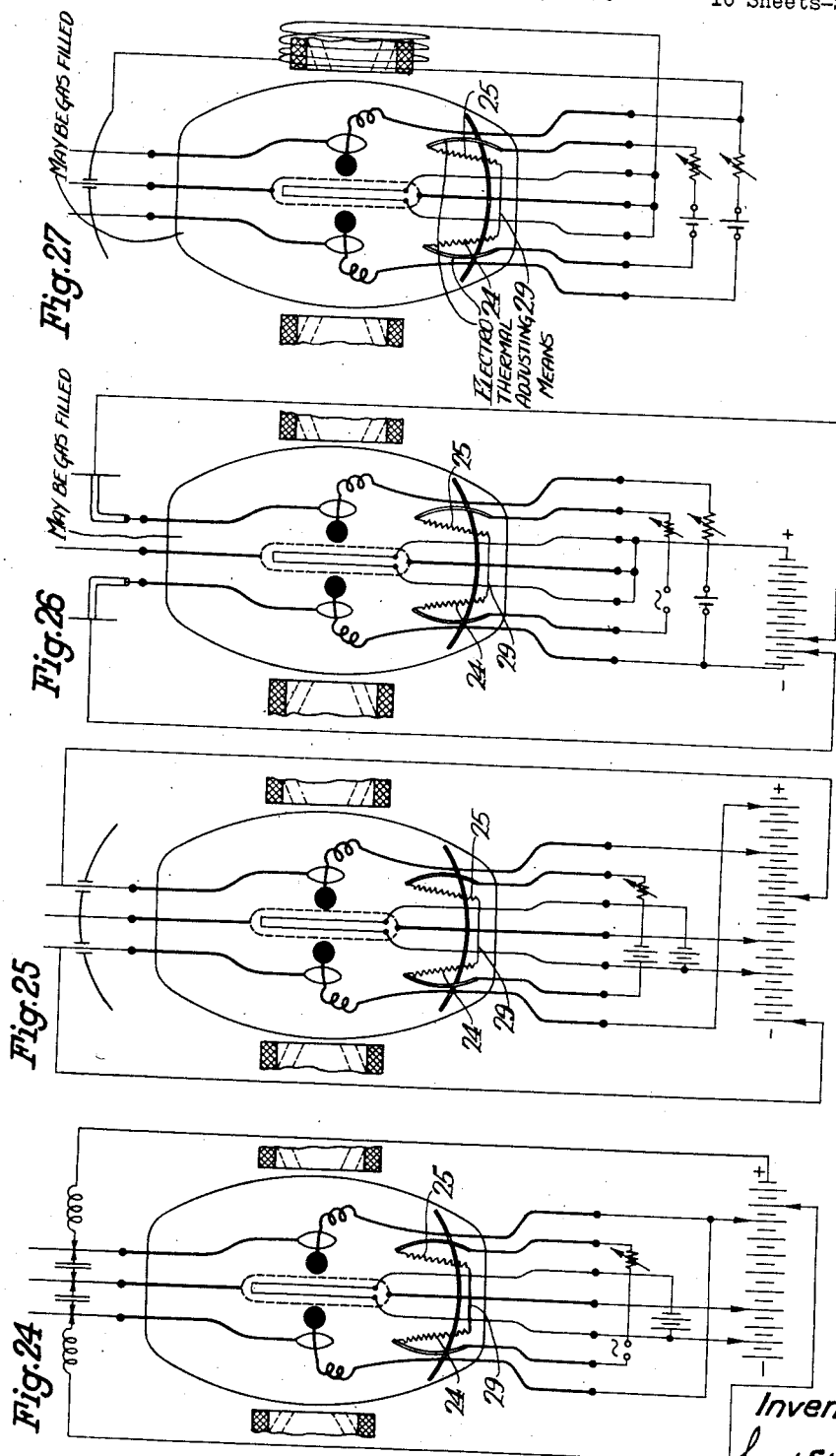

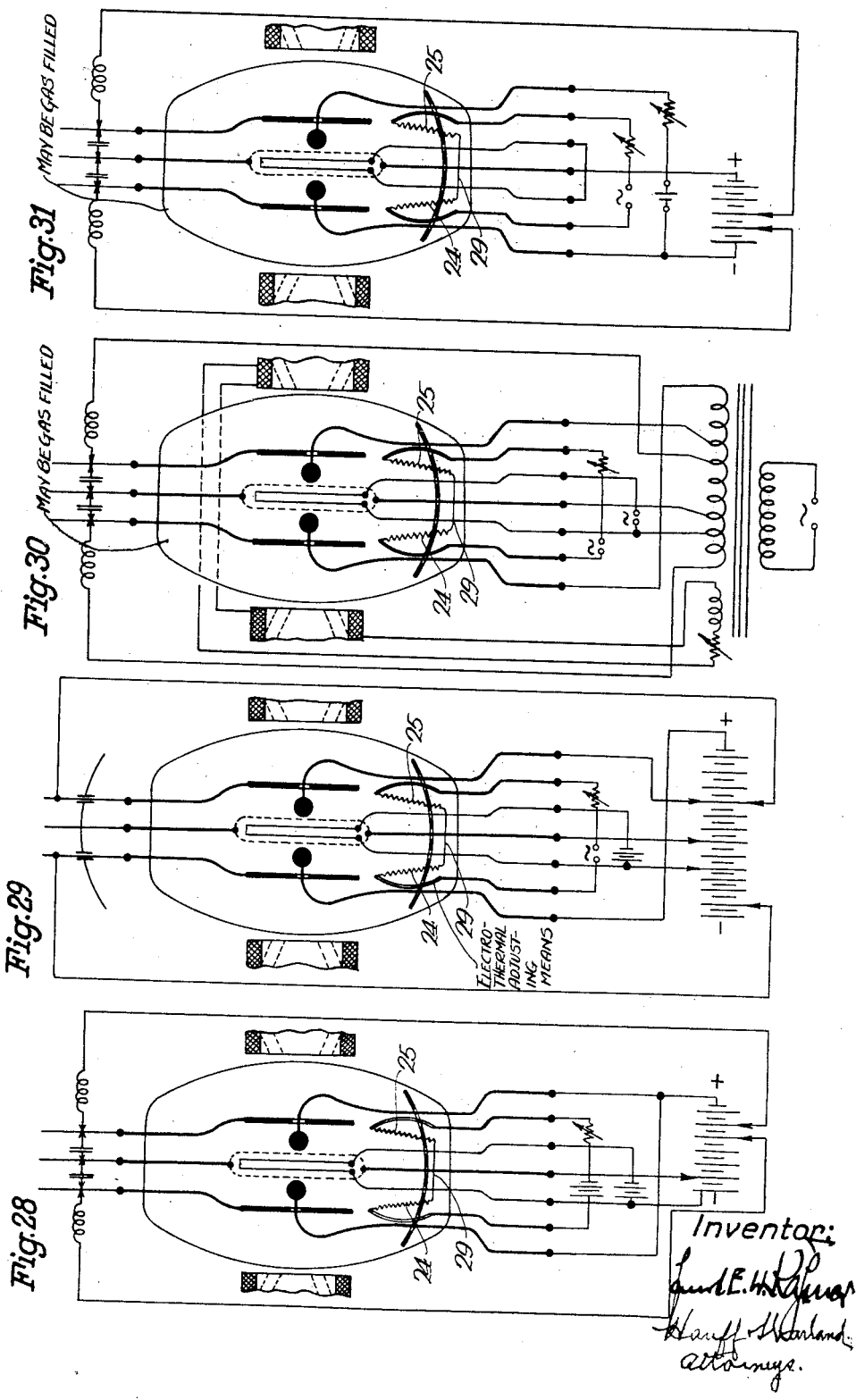

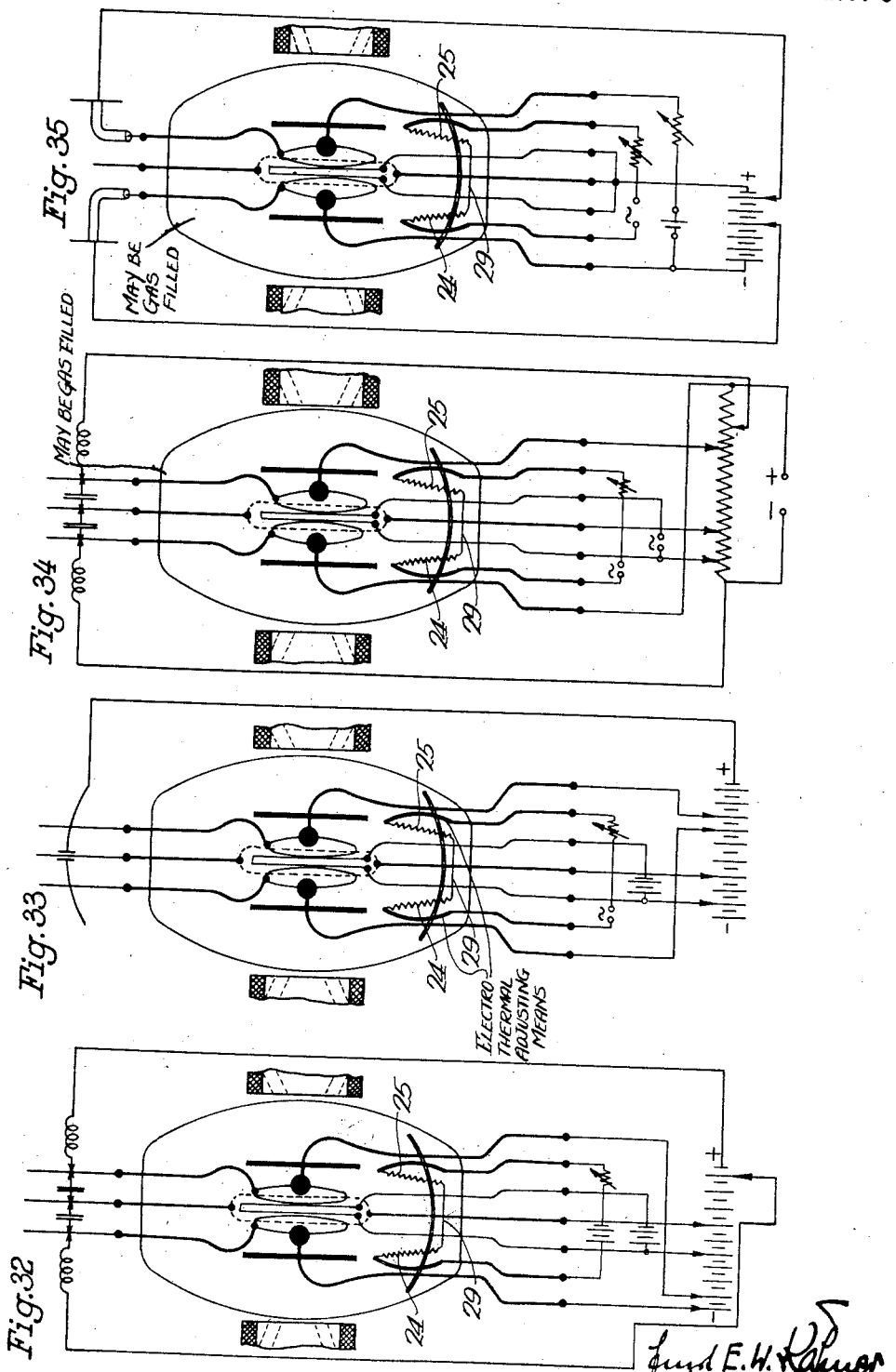

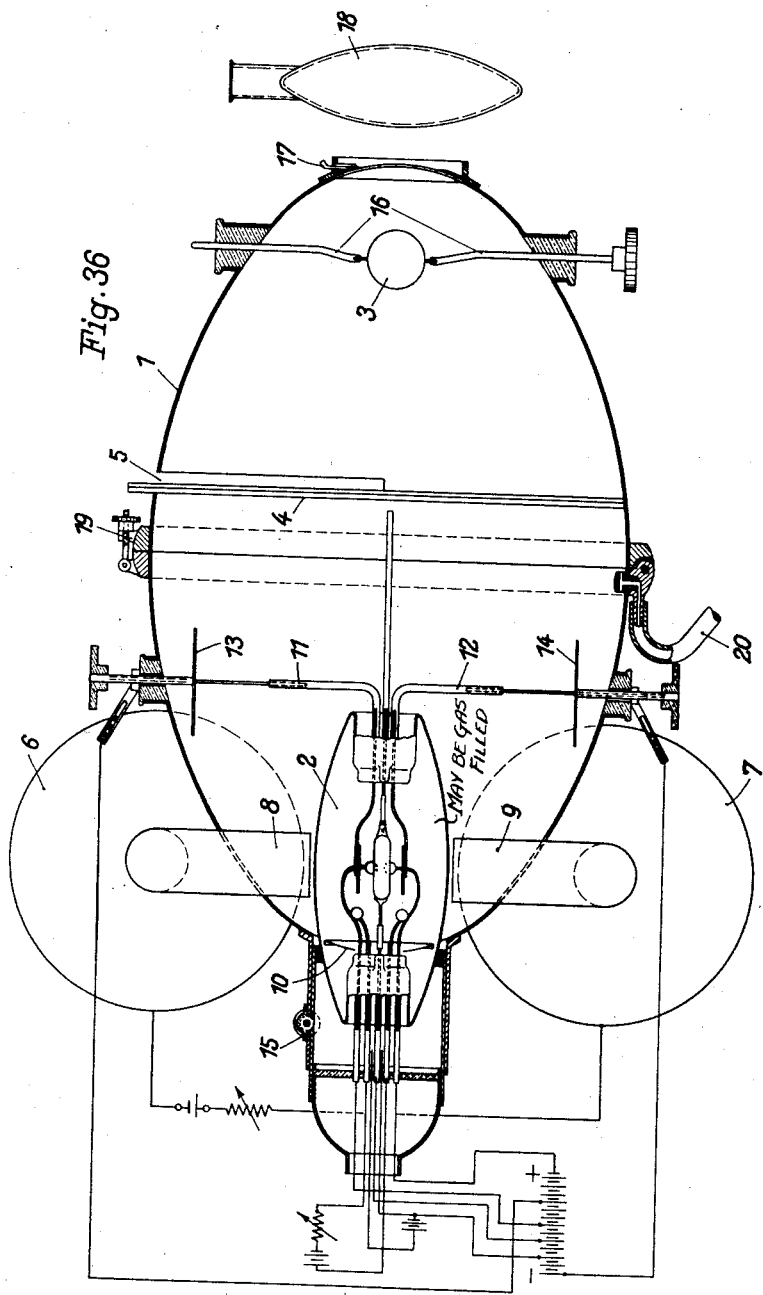

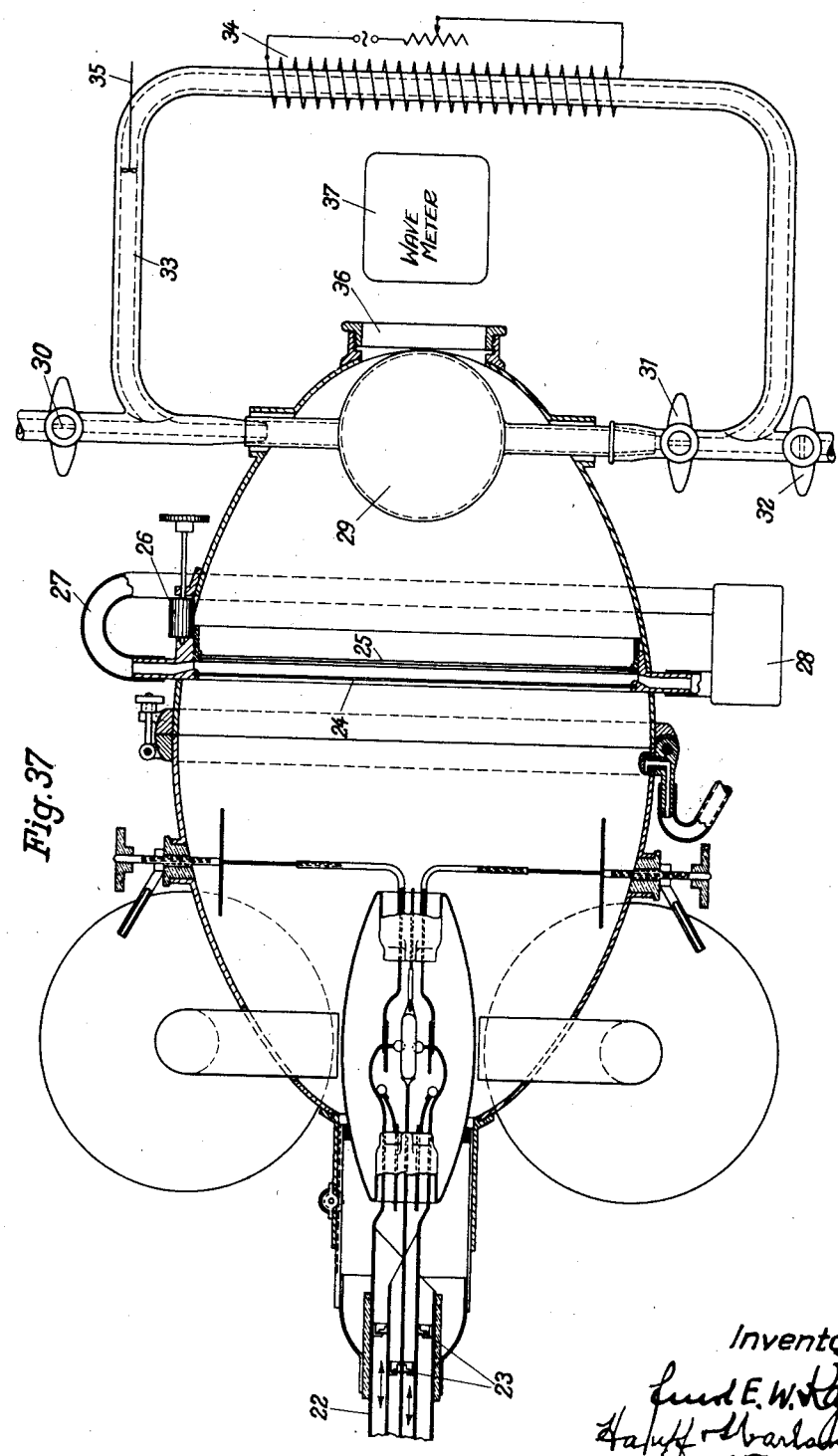

Patented Oct. 5, 1937

2,094,602

UNITED STATES PATENT OFFICE 2,094,602

APPARATUS FOR THE GENERATION OF SHORT ELECTROMAGNETIC WAVES

Ernst Eduard Wilhelm Kassner, London, England

Application September 15, 1934, Serial No. 744,119½. In Germany August 31, 1933

45 Claims. (Cl. 250—36)

The excitation and control of continuous electromagnetic waves by means of electronic valves for technical purposes becomes more difficult as the wavelength is decreased and especially as it becomes only a few centimetres or millimetres, that is, lies within the so-called quasi-optical range of wavelengths. With known types of valves, it has hitherto been impossible to excite oscillations over the whole of a continuous range extending to the highest frequencies. Gaps appear in the frequency spectrum, large or small, in which it is impossible to maintain the oscillations constant and reproducible, since the conditions necessary for stability can be no longer secured by existing arrangements.

The procedure followed hitherto in decreasing the length of the waves is to make valves with very small electrodes. But increase of the energy output necessarily increases the load and the small electrodes become distorted. The subject of this invention is a new form of discharge tube containing resonance systems of a new kind, coupled loosely or closely to each other, which enable oscillations to be excited over the whole of a wide range of frequencies and also enable the range of wave-lengths obtainable to be materially increased. Moreover, the new valves can carry higher loads without danger to the electrodes from overheating.

In consequence of the new construction, it is possible to operate the tubes under the most varied conditions corresponding to many different forms of oscillation, which may be excited consecutively or simultaneously. It has been found that the oscillations are stable and reproducible without any subsidiary devices.

According to the invention, a spherical electrode is arranged on either side of the central plane of a circular filamentary electrode system and on a line perpendicular to that plane passing through the centre of the system. The electrode system, which may consist of one or more thermionically emitting wires bent into circles, is surrounded, according to the invention, by a ring-shaped screen electrode whose cross section is the segment of a circle.

The ring-shaped filamentary electrodes are arranged in parallel planes and are connected together in such manner that heating current flows therethrough in opposite directions so as to neutralize the magnetic field produced thereby.

On either side of the central plane of the filamentary system and parallel to it, an annular or possibly disc-like electrode may be arranged. Each electrode can be connected to the exterior of the envelope by lead-in wires which serve also as wave conductors. Preferably the leads to the screen electrode are taken out through both ends of the envelope, while those to the ring electrodes are taken out at one end and those to the other electrodes at the other end. Metal discs are preferably placed on the supports of the spherical electrodes between them and their lead-in wires.

According to the invention, a spring is introduced into the support of each spherical electrode between it and its lead-in wire; the spring can be shunted by a flexible conductor. Further insulators, carried on the ends of bi-metal strips fixed on separate lead-in wires, bear electrically against the supports of the spherical electrodes. A metal wire or strip is wound around each bi-metal strip with one end connected to the bi-metal strip at its free ends and with the other connected to the other wire or strip.

In this way, the distance between the spheres can be varied. If a current is passed through the wires surrounding the bi-metal strips, so that they are heated, the strips bend and so displace the sprung spherical electrodes by means of the insulators.

The filamentary electrodes are made of thermionically active material. The spheres are made of refractory metal, which will not weld and may emit electrons when heated.

Preferably insulating members are connected between the seals to provide rigidity. Choke coils may be inserted between any electrode and its lead.

Inside the envelope a reflector may be provided at the end where the leads to the filamentary electrodes are sealed in, conductively connected to the screen electrode and capacitatively connected to the other lead-in wires.

In high vacuum valves or discharge tubes, the potentials of the electrodes relative to the filamentary electrode, which serves as cathode, may be as follows:—The spherical electrodes at equal or unequal positive potentials; the screen electrode at a lower positive or zero potential; the ring electrodes at equal or unequal potentials, which may be positive, slightly negative or zero. But alternatively the ring electrodes can have equal or unequal positive potentials, the spherical electrodes lower positive potentials (equal or unequal), the screen electrode a slightly positive or negative or zero potential. In this arrangement the spherical electrodes can also have negative potentials, equal or unequal.

In gas-filled discharge tubes, a potential sufficient to cause a discharge may be established between the spherical electrodes. Relative to one of them, the filamentary and screen electrodes may have a more or less positive potential, equal or unequal, and the ring electrodes may have a positive or slightly negative potential, equal or unequal.

The potentials applied to the electrodes may be wholly or in part variable or alternating.

The path of the discharge may be influenced by suitably placed magnets establishing a field between the electrodes; the magnets may be permanent or excited by one or more supply circuits.

The wave conductors, which contain no chokes or pass through a reflector within the envelope, can be coupled together directly or partially through equivalent resistances (for instance parallel wires) by means of tube resonators, load circuits or the like, with or without reflection bridges.

Each pair of electrodes may be independently tunable. By one- or two-sided tuning of the wave conductors against each other, the system can be tuned to one or more frequencies. Tuning to one or more frequencies can also be effected by displacement of the spherical electrodes. Linear or di-pole radiators can be connected to the leads of the wave-conductors.

According to the invention, the discharge vessel can be enclosed in a metal case with openings, which preferably consists of several separate parts and as a whole has the form of an ellipsoid of rotation. The discharge vessel within the metal case can be movable longitudinally, wholly or in part, along some or all of the connected wave conductors. Some or all of the wave conductors carried within the case can be connected to the voltage supply by leads insulated from the wall of the case, possibly furnished with reflecting surfaces, and adjustable, for example, by telescopic members bearing on or around the wave conductors.

In order to adjust the reaction, a removable body, reflecting the radiation, for example a resonator, can be arranged in the metal case at that end remote from the generator.

The means for altering the position of the reflecting body is supported by insulators from the metal wall, according to the invention. The position can be altered by means outside the case.

A layer of dielectric of variable thickness or dielectric constant can be arranged in the radiation field, especially in a plane of symmetry. The dielectric layer may consist of material introduced between or around plates permeable to the waves, and may be variable in temperature. The thickness of the layer can be adjusted from outside the metal case by means insulated from the walls. The material of the layer may be one that extinguishes the radiation.

In order to irradiate once or repeatedly materials passing through the field, either uniformly or non-uniformly, means for regulating the flow of the material and its temperature may be provided outside the metal case. The material irradiated may be influenced by a subsidiary device for altering its electrical condition.

The irradiated material can also be arranged wholly or partly outside the case. For this purpose diaphragms or the like may be introduced at or in the opening of the case through which radiation emerges. Means for influencing the radiation, such as lenses, reflectors and the like, can also be inserted in the path of the radiation.

Preferably one or more entries for cooling water are provided in the wall of the case. Further, instruments for measuring the radiation can be inserted in its path.

If the spherical resonator system is excited by electrons and ions into its natural electrical and magnetic oscillations, according to the present invention there may be coupling within the tube between tuned oscillators.

Electromagnetic theory permits an approximate calculation of the natural frequencies of the resonator consisting of spheres, sphere-dipoles, plates and rings. A conducting sphere or a circular plate, having, for example, a diameter of 1 cm. or a radius of 2 cm. possesses a series of electrical and magnetic natural frequencies which can be calculated by means of Hankel and Bessel functions, having wavelengths of the order of millimetres or centimetres and but slightly damped.

The principles underlying the invention just explained can be set forth in greater detail as follows.

(1) The generation of oscillation is effected by means of novel oscillatory formations which are especially effective in the quasi-optical frequency range and which possess a great number of electric and magnetic natural frequencies within the above mentioned frequency range. The resonance formations consist of single or combined systems of metallic spheres, plates or rings, which are applied as oscillatory formations in different ways either separately or in combination with each other in such a manner that with a system of spheres and plates a sphere resonance and an adjoining plate resonance or vice versa are used simultaneously apart from the separate excitation of the spherical or plate resonators.

(2) The resonance systems are arranged in pairs about a centre of symmetry within the tube forming a multiple system. The electrode supports serve not only as leads for the constant supply voltage, but also as tuned wave conductors or linear oscillators.

(3) In a system of two spheres the sphere distance is adjustable according to desire by means of a thermic adjusting device. An alteration and a heterogeneous coming into effect of the natural frequencies and of the static field distribution is thereby effected.

(4) The excitation of oscillation is effected by formation of periodic pulsation of space charge in the field of the resonators or in their surrounding. The pulsation of space charge is caused by concentrated masses of electrons and by the co-operation of charges of ions or electrons being electrically and magnetically controlled and possessing different velocities. There consequently exist two kinds of construction of the sphere resonance valve, i. e. as high-vacuum valve with heated cathode or as gas-filled voltaic-arc ion-valve. These types of valves can be worked in the same arrangements and constructions in such a manner that in case of the valve containing a gas-filling the cathode is not used for the emission of electrons but as controlling electrode.

(5) The spherical resonator system is surrounded by a concentric annular cathode whose plane is perpendicular to the axis of the system of spheres, plates and rings. If the spheres lying on the centre of the cathode ring are made positive relatively to that ring, which gives thermionic emission, the electrons emitted by the cathode travel radially along the field to the centre and there produce periodic, pulsating, space charge concentrations under their mutual reactions and the influence of external magnetic field and retarding electric field.

(6) The cathode is constructed as double ring through which heating currents of inverse directions flow, this for the purpose of neutralizing the magnetic field.

(7) The cathode ring is externally surrounded by a concentric control cylinder sector serving for the influencing of the emission and for the control of space charge impulse of the cathode space charge field.

(8) A pair of ring electrodes inserted into the field between the cathode ring and the spherical resonators possesses the following functions for different manners of working:

a. The functions of a static potential electrode for directed control of electrons;
  b. The functions of a ring grid for controls of brake field and space charge;
  c. The functions of a ring resonator and of a wave coupling electrode.

(9) Another pair of ring electrodes outside the electrode system serves in this form of tube both as a coupling for the waves and as a limiting device for the effective length of the electrodes of the sphere resonator in respect of electric wave emission.

(10) The secondary emission of the spheres in combination with the controlling magnetic and electric fields serves further to excite oscillations. For this purpose the spheres are raised to different potentials, so that, with the help of the plate and ring resonators (also under potential and acting as control electrodes), the main electron emission is directed to the sphere at lower potential. This electrode is raised to a white heat; the secondary and thermionic emission from it constitutes a stream of electrons between the spheres, across the original stream and following a spiral path under the magnetic and electric fields. Under the influence of this stream secondary emission may also be produced at the other sphere.

(11) Through unequal potentialing of the spheres adverse electrons of different velocity are caused to meet near the spheres and to transmit inductions to same which are produced by temporal as well as spatial pulsations of space charge or periodic balancing processes.

(12) The electric operating voltages which are supplied to the separate electrodes of the valves are direct voltages or alternating potentials. Generally the direct voltages are galvanically linked as per connection. Unlinked voltages, i. e. tensions which are not galvanically connected with the main field, can also be supplied to the different resonators and electrodes for the purpose of producing transverse fields through which the electrons pass. The unlinked voltages serve especially for the purpose of avoiding loss currents through the battery or other current sources. The operating alternating potentials which periodically fluctuate from zero to the adjusted highest tension are used for the excitation of a quasi-optical frequency-band, the filament heating of the cathode being either effected by direct or by alternating current.

(13) The use of poled magnetic fields running synchronously or oppositely in combination with electric control fields, serves for producing curved or closed electron courses for the mechanism of the most varied types of oscillation. The magnetic field is directed by the external poles either along the line joining the spheres or at any angle up to a right angle thereto; the form of the field is controlled by the shape of the poles.

(14) Apart from constant magnet fields, magnetic alternating fields are likewise used, the high tension secondary windings for the electric field being suitably arranged on the magnetic field windings.

(15) The types of function and oscillation of the gas-filled sphere resonance valve are based on the formation of the voltaic-arc between the spherical resonators. In this case the regulation of the sphere distance has still a further function, i. e. the adjustment of the length of the arc being especially required for arc ignition. The spherical electrodes used consist of heat-resistant and emissive material which must not weld with each other.

(16) The excitation of oscillation is effected by utilizing the falling arc characteristic in combination with the influence of electric and magnetic control fields. The resonance formations are the same as with the high vacuum valve. The above-mentioned plate- and ring-arrangements are likewise used in similar functions. They serve as static potential electrodes for extending the voltaic arc, for controls of space charge impulse as well as of space charge density and for wave coupling just as the unheated cathode system and its control cylinder sector do.

(17) The connection of the electric operating voltages of the ion valve is likewise effected by direct voltages or alternating potentials as aforementioned. The magnetic fields are also applied in the same manner as aforementioned.

(18) The utilization of the ion resonance of gases for the purpose of oscillation excitation and wave radiation is a special characteristic of the sphere resonance voltaic arc ion-valve. Here the resonance conditions of the longest-waved transitions of the terms of the filling gases or gas-mixtures highly ionized during the operation, for instance hydrogen, helium etc., lying in the quasi-optical frequency range come into interacting resonance coupling to the adjoining oscillation resonators.

(19) The working adjustment of different connections is given by the separate leading-out of the various electrodes and resonators, so that the leading-in electrodes which are constructed as wave conductors and joined for instance to tube oscillators are tunable in synchronism and push-pull. In connection with the electric and magnetic working connections the most varied tuning and potential distributions are combinable according to types of operation and oscillation.

(20) The energy of the oscillations is drawn off by coupling to the load through the arrangements already mentioned or (in the quasi-optical region) by radiation. In this case, either kind of tube may be placed at the focus of a parabolic or elliptical mirror. According to the invention, a closed ellipsoid of rotation, with adjustable diaphragms and phase-regulating devices is provided, so that the tube lies in one focus and in the other lies means for radiation reaction and tuning standing waves or for absorbing the radiation for technical purposes.

(21) In different examples of construction a reflection device is situated within the sphere resonance valve for avoiding losses through the supplying leadings, said reflection device serving as capacitive wave bridging for longer waves or for the purpose of radiating reflection for highest frequency oscillations and being so constructed inside the valve that same constitutes the continuation of the external rotation ellipsoid.

The process of effecting an electro-magnetic sphere or plate oscillation is comparable to that of a parallel conductor oscillation. Upon the electric excitation of a parallel conductor system by means of electron oscillations, alternating potentials are induced at opposite points of the parallel conductor through oscillating or helically rotating electron space charges, these alternating potentials causing a standing wave oscillating condition on the system owing to reflection of the progressing electromagnetic wave.

The excitation of the spheres is likewise effected by space charge fluctuations and periodic operations of charge balancing between the spherical surface and the adjoining field. In this case the electron space charge can pulsate around the spherical surface corresponding to a radiator of zero order or can hasten over the sphere as helically rotating or periodically pulsating electron cloud. The tensions induced by the charges and balancing processes cause the sphere to radiate electromagnetic oscillation energy.

The excitation of the plate resonator system is likewise effected by induction of tensions by means of space charge rotations or periodic balancing processes at the centres of the plates or in other oppositely situated parts of the plate pair. The wave thereby produced extends concentrically from the excitation point to the plate edge so that, if the plate is swinging in one of its natural frequencies, an oscillation condition of standing waves which is characterized by two-dimensional configurations of the nodal positions (i. e. analogous to sound figures) is caused by edge reflection.

The above explained particular principles, types of oscillation and working orders of the object of invention result in various manners of construction of the spherical resonance valve by suitable combination of separate devices with each other. The examples of construction for heated cathodes as well as for operation with ions have fundamentally the same arrangements in their systemal structure inasmuch as different kinds of ring- or plate-resonators are arranged with the central sphere resonance system so as to constitute separate valve types. Some examples of constructions with differently constructed resonator arrangements are shown by the Figures 1 to 10. When under high vacuum the valves are intended for heated cathode operation, when gas-filled, they are intended for voltaic arc-operation of ions.

Figures 1 to 4 represent schematic,

Figures 5, 7, 9 constructive examples of execution invention. While the above figures show longitudinal sections of the same view, the Figures 6, 8, 10 are sectional side elevations turned round by 90 degrees as against the preceding illustrations.

Figures 11 to 34 show examples of connection of different valve types, the

Figures 11 to 15, 24, 25, 28, 32 to 34 being applied for heated cathode operations and Figures 16, 17, 26, 27, 31, 35 for voltaic-arc-operation of ions.

Figures 18 to 23 show electron operation curves of different types of oscillation.

Figures 36 and 37 show the arrangement of the sphere resonance valve within a rotation ellipsoid for tuning of standing radiation waves and devices for radiation absorption etc. utilized in practice.

The insertion of the oscillatory formation discussed in the separate principles will be explained by means of the diagrams Figures 1 to 4 with four types of construction α, β, γ, δ, of the sphere resonance valve to serve as examples. The spherical resonators 1, 2 fastened to the electrodes 3, 4 are situated in the central axis of the valve system as shown by the valve type α in Figure 1. The ring electrodes 9, 10 symmetrical with regard to them, are supported on the electrodes 11, 12 which serve at the same time as wave conductors. Concentric with this arrangement is the cathode system, consisting of a ring 13 of oppositely directed cathode filaments, the leads 14, 15, and the screen electrode 16 surrounding it and supported by the wave conductors 17 and 18. The filaments may be connected together in any desired manner to cause current to flow in opposite directions in the two parts thereof so as to neutralize the magnetic field produced by the filament current. The filaments are indicated as connected together at the top merely for convenience of illustration. The variation of the sphere distance is effected by thermo-strips 19, 20 for which purpose the electrodes 3, 4 are constructed in such a manner that they allow for a lateral flexible inflection as shown in the dotted drawing in Figure 9. The current supply for the heating of the thermo-strips is effected by means of the leads 21, 22.

In the example of construction β of Figure 2 the spheres 1, 2 are fastened to their supporting electrodes 3, 4 through the reflection chokes 5, 6. The control and coupling rings 9, 10 are arranged between the spheres and chokes and are supported by the wave conductor electrodes 11, 12. The cathode system 13—18 as well as the thermo regulation of sphere-distance 19—22 corresponds in its arrangement to the valve type α (Figure 1). The reflector 23, blocking the waves, must be insulated from electrodes 3, 4, 14, 15, 21, 22 and may be connected, if desired, to electrode 18 by means of a suitable connection not shown. The insulation from the said electrodes is such that the capacity is as great as possible.

The examples of construction of the valve types γ, δ in Figures 3 and 4 illustrate the application of the plate resonators instead of or in combination with the ring electrodes. In Figure 3 the plate resonators 7, 8 are, in symmetry to the other valve devices, fastened to the wave conductor electrodes 11, 12. They each possess one central boring, provided with a suitable diameter for wave couplings, through which the electrodes 3, 4 for the sphere resonators 1, 2 pass. All further valve devices, cathode system 13 to 18, thermo distance regulation of the spheres 19 to 22 reflection bridge sector 23, are arranged in the same manner as explained in Figures 1 and 2. The same arrangement of electrodes as in the valve types α, β, γ is likewise given in the valve type δ in Figure 4. With this mode of execution the resonator plates 7, 8 are rigidly connected to the supporting electrodes 3, 4 and the spheres 1, 2, the ring electrodes 9, 10 being inserted within the sphere plate system as explained by the valve type α Figure 1.

As shown by these principles of arrangement chosen as examples, the separate valve types differ in their structure only in the arrangement of the ring or plate resonators for the purpose of excitation of varied frequency ranges. The ring electrode pair of the mode of execution represented in Figure 1 is displacedly arranged in the valve type β shown in Figure 2, the constructive formation of which is explained in the Figures 5–6, other operating conditions being brought into function thereby. In addition, plate resonators are fastened within the valve either instead of the ring electrodes or in a linked arrangement with them as shown by the valve types γ, δ in Figures 3, 9, 10 and Figures 4, 7, 8. These plate resonators are either constructed as resonance formations with independent potential supplies (Figures 3, 9, 10) or they form a rigidly connected plate- and sphere-system (Figures 4, 7, 8) which can be connected to tunable oscillatory formations in a way similar to that of the valve type α by omission of the reflecting mirror 23 (Figure 2).

The constructive formation of some examples of execution is explained by the Figures 5 to 10. The squeezes 45, 46 consisting of thermally highly strainable glass are sealed with the rotation-elliptical glass body 44 (Fig. 5) made of the same glass. The leading-in electrodes 11a, 12a, 17a constructed as wave conductors as well as the connection supports 47, 48 (Figure 6) are sealed in into the cross-squeezes 45, and the leading in electrodes 3a, 4a, 14, 15, 18, 21, 22 are sealed in high-vacuumproof into the cross-squeezes 46. The spheres 1, 2 consisting of highest heat resistant emissive material are fastened to the ends of the holding supports 3, 4 likewise consisting of most heat-resistant metal, said ends being wound as chokes 5 and 6.

The spheres 1, 2 are mounted on the electrodes 3, 4 the flat springs 26, 27 allowing for variation of the sphere distance. The thermostrips 19, 20 which, through the insulation spheres 28, 29, transfer their movement of curvature to the holding braces 3, 4 and thereby effect the variation of distance of the spheres, are heated by the conically constructed heating spirals 24, 25. The diminuating end of the winding of these spirals is in conductive connection fastened to the thermo-strip near the insulating spheres. The supply of heating current for the spirals is effected through this point by the electrodes 21, 22 and the thermo-strips 19, 20, and the heating circuit is closed through the wire loop 49 joining together the free ends of the spirals which have the greatest diameter. The self supporting conical form of this heating-spiral allows for a considerable curvation of the thermo-strips in such a manner that a contact between strip and spirals is avoided.

The control cylinder sector 16 is on the one hand fastened to the choke 32 into which the electrode 18 ends (Figure 6), and on the other hand to the mutual wave conductor leading-in electrode 17, 17a. The adversely wound cathode filament ring 13 fastened to the chokes 30, 31 into which the leading-in electrodes 14, 15 end getting its current supply from same, is situated within the control cylinder sector 16. The cathode ring 13 is maintained in its position within the cylinder sector by the hooklike filament supports 33, 34, 35 projecting into the cylinder sector through openings and being insulatedly fastened to the electrode 17 (33) and to the stabilization braces 36, 37 (34, 35).

The stabilization braces consist of glass rods or glass tubes curved into suitable shape, into the ends of which the metallic connection supports 38, 38a and 39, 39a (Figure 6) are sealed in. This device has the purpose of giving the whole system an increased stability and capacity of resistance against unintentional deformations during the mounting and adjustment as well as during the sealing in of the finished system into the glass body. The glass braces 36, 37 connect, on the one hand, the cross squeezes 45, 46 through the Y-shaped connection shells 42, 43 fastened to the electrodes 14, 15 and, on the other hand, the connection shells 40, 41 fastened to the connection supports of the cross squeezes 45.

The coupling rings 9, 10 (Figure 5) attached on the wave-conductor electrodes 11, 12 are connected with the wave conductor electrodes 11a, 12a by the shells 50, 51.

The reflection bridge sector 23 possessing openings for the passage of the other electrodes is fastened to the electrode 18 by metallic connection. Metallic cylindrical shells 52, 53, 54, 55 are fastened in these openings at the transit points of the wave conducting electrodes 3a, 4a, 14, 15 and enclose the leading-in electrodes as tightly as possible with the assistance of inserted insulating shells 56, 57, 58, 59, thereby causing the aforementioned capacity wave bridging. This arrangement is not necessary with the electrodes 21, 22; only the insulating shells 60, 61 are inserted for increasing the insulation.

In the example of construction valve type δ of the Figures 7 and 8 which corresponds to the schematic arrangement of principle of Figure 4, but leaves out the reflection bridge sector 23, not only the spheres 1, 2 but also the plate resonators 7, 8 consisting of thermally highly strainable non-magnetic metal are fastened to the supporting electrodes 3, 4. The supporting electrodes 3, 4 and the leading-in electrodes 3a, 4a are constructed as wave conductor electrodes in this mode of construction, the shock joints formed by the flat springs 26, 27 being bridged by means of the tape wire wave conductor conduit 62, 63. Since the cathode and screen electrode leads 14, 15, 18 also serve as tuned wave conductors, the chokes shown in Figs. 5, 6 are omitted and these leads end directly on the filament 13 and the screen 16. In this construction, the ring electrodes are arranged in the cathode plane and are larger in diameter than those of Figures 5 and 6; their mechanical relations are, however, the same as in those figures, and so are the details of the bi-metals for regulating the distances of the spheres.

The example of construction of Figures 9 and 10 the cathode-cylinder-sector and thermo-sphere-distance regulation system of which corresponds with the illustrations of the Figures 7 and 8, represents the constructive development of the valve type γ as per Figure 3. The spheres 1, 2 are directly fastened to their supporting rods 3, 4; the dotted line in this illustration shows which greatest distance can be given to the spheres by means of the thermo-device. In this mode of construction the plate resonators 7, 8 are fastened to the supporting electrodes 11, 12 as independently tunable plate systems possessing a central boring through which the supporting electrodes 3, 4 of the spheres pass.

On base of the aforementioned modes of construction as per invention the following varied operating connections for oscillation excitation are explained, examples being given in Figures 11 to 34. The same modes of construction α, β, γ, δ of the sphere resonance valve are, in these illustrations of connection, used as highly evacuated electron valve or as gas-filled ion-valve.

Three groups of function can be distinguished with these connections:

1. The circuit—as well as supply-distribution of the electric and magnetic working and control tensions.
2. The tuning of the conduits carrying oscillation energy and the coupling of the wave conductors.
3. The tuning of standing radiation waves within a rotation ellipsoid by means of reflection resonators as well as of further devices for phase regulation and radiation absorption.

With the mode of construction (Figure 1) the tuning of the conduits is effected on both sides of the valve while with the modes of construction $\beta$, $\gamma$, $\delta$, Figures 2, 3, 4) which possess a built-in reflector for the lower conduits, only the upper conduits are tuned. In the range of longer wave the tuning serves as control of impulse of space charge etc. and, in case of the conduits being developed as double or multiple wave conductors, is effected by shiftable condenser bridges of reflection plate. These are situated in the potential nodal point of the oscillation to which likewise the supply conduits are connected. As shown in Figure 37, concentric tube systems etc. can be used instead of the tuning arrangements schematically illustrated in the connections. For shorter wave ranges in the centimetre and millimetre-wave range, in which the oscillation is for the greater part no more directable by conduit but propagates as space radiation, the valve is used in reflection arrangements by, for instance, being arranged in the one focus of a rotation ellipsoid in such a manner that a reaction coupling of radiation from the other focus to the oscillation generator, by means of reflection resonators as well as by the interposition of a system for partly detraction of radiation is made possible.

To start with, examples of connection of the mode of execution $\alpha$ as shown by Figures 11 to 17 will be explained According to Figure 11 a high positive control tension is established between cathode- and control-rings, while a low positive or negative bias is given to the spheres as well as to the control cylinder with regard to the cathode. In this connection as well as in all the following connections for high vacuum operation the bias of the control cylinder sector 16 serves for the regulation of the cathode emission.

The regulating device for sphere-distance which, for the purpose of avoiding over-charging, is connected with the cathode potential or can be biased low-negatively, is worked by a regulable source of direct or alternating current.

Besides the electric control tensions of the connection Figure 11 a magnetic field is put into action in the direction of the sphere-connection-axis. The tuning of the external conduits is effected at the corresponding electrodes by bridging condensers between the wave conductors as demonstrated. The oscillations obtained by means of this connection are produced by periodic fluctuations of space charges which are caused by an oscillating of the electrons emitted from the cathode between the control rings and spheres. The magnetic field perpendicular to the motion of the electrons, where they collect in the centre of the system curves the paths, or, if the field is sufficiently strong, breaks them into arms, as shown in Figs. 18, 19. The excitation of oscillation arises in a space charge interference region which is produced by the meeting of adverse electrons so that the concentric space charge receives pulsating controls through the electron densities of the course-loops. A further amplification of the oscillation is effected by impulse control of the space charge region of the cathode in consequence of the tuning of the conduits. Tuning arrangements as per Figures 12 to 15 can also be applied instead of the tuning manner explained in Figure 11. They are brought into effect by including the different electrodes and wave conductors, the reflection plates having to be supplanted by condenser bridges in case of supply of operating voltages of varying height. Likewise the tuning manners of the connections 11 to 15 can be exchanged with each other by retaining the static operating voltages; this equally applies to the following connections of the valve types $\beta$, $\gamma$, $\delta$ and consequently will not be mentioned in particular again.

In contrast to the connection Figure 11, the connection Figure 12 possesses a magnetic field turned round 90°, the distribution of the electric operating tensions being, for the rest, similar to that of Fig. 11. The electrons are unevenly influenced by this direction of the magnetic field, the greatest magnetic influencing being effected in the course-component which is transversal to the magnetic field direction. The electrons most highly influenced run through curved courses or course-loops which are curved in correspondence to the power of the magnetic field as indicated in the Figures 20, 21, while the electrons moved in the direction of the magnetic lines of force are only partly deviated.

The process of oscillation of this connection is analogous to that of Figure 11. Here too a resonance coupling of the effective oscillatory formations is effected by development of controlled space charge concentrations and in consequence of the electrons moving in course-loops.

In the further connections (Figures 13 to 15) the secondary emission of the spheres is brought into effect for the purpose of exciting oscillation. The connection as per Figure 13 possesses again a high potential between cathode ring and control rings. The spherical resonators are likewise on positive potential. A secondary electron current is produced between the spheres and those rings which lie at highest positive tension by the electrons hitting the spheres. A falling characteristic is thereby caused between the spherical and ring-system, which falling characteristic effects the excitation of oscillation near the sphere in combination with the influence of the magnetic field and the space charge interference region.

With this connection as with all the following ones the magnetic field is used in the direction of the sphere connection as shown in Figure 11, as well as up to the direction turned round 90° (Figure 12), oscillation variations of varied frequency ranges being produced thereby. Only one arrangement of direction of the magnetic field is sketched-in in the connection of Figures 13 to 34 in order to avoid repetitions, the electrons running together centrally through the influence of a positive acceleration field (between the spheres and the cathode) in case of all high vacuum valves of the types $\alpha$, $\beta$, $\gamma$, $\delta$ being influenced in the same analogous or similar way as shown in the Figures 18 and 19 or, with turned magnetic directions, as shown in the Figures 20 and 21.

The connection Figure 14 shows a working order for operation of alternating current corresponding to that of connection 13. The alternating currents and operating voltages for the valve electrodes as well as for the electromagnet are taken from a common transformer. The operation with alternating potential serves for the excitation of a frequency band, as the oscillation excitation which depends from the tension runs through different frequency ranges according to the height of the adjusted alternating potential amplitude.

With the connection Figure 15 the potential distribution is arranged in such a manner that a secondary electron current for oscillation excitation is released between the two spheres. For this purpose the spheres and control rings obtain potentials of different height regulable independently from each other. By these tunings of tension the electron current of the cathode ring is directed to the sphere lying at the lower positive potential, a secondary electron current thereby being transferred to the other sphere. On the one hand, the secondary electron current is forced into circular courses in consequence of the directing action of the magnetic field so that, the electrons, with the assistance of the electric field of the control ring, rotate in such helical course-loops as are shown in Figure 22. If the magnetic field is perpendicular to the line joining the spheres, paths are formed for the electrons flowing between the spheres as shown in Fig. 23, while, with these kinds of operation, the electrons emitted from the cathode ring effect a secondary heating of the spherical system and a corresponding spherical emission in addition to the secondary emission. The excitation of oscillation is effected by influencing the sphere space-charge region by means of the rotation current transferring between the spheres whereby the spheres are caused to radiate highest frequent electromagnetic waves. The tuning of the waves is effected by regulation of the sphere distance and of the reflectors.

For the generation of a frequency band this connection can likewise be worked with alternating current instead of with the direct operating tensions given in Figure 15. In this case the direct current source is to be replaced by an alternating current source, there being the possibility of equally using direct voltages with superposed alternating potentials as per aforementioned connections.

Examples of connection for voltaic-arc ion operation of the valve type which is brought into function by development of a voltaic arc between the spheres, are described below.

Figure 16 shows the voltaic arc circuit consisting of a direct current source and a series resistance. The regulation of ignition and tuning of the distance of the spherical resonators is effected by a special circuit as per the aforementioned arrangements. As shown in circuit 16 the other electrodes are made positive to the spheres so that the negative ions from the arc are deflected sideways. The electrons and, to a lower degree, the ions are influenced by the magnetic field which here too can be used in both directions the influence of which has already been explained in Figures 22 and 23.

In the present connection the oscillation excitation is produced through the falling characteristic of the voltaic-arc between the spheres. Here too the production of space charge concentrations by a magnetic field is important for the generation of oscillation. The tuning of the conduits is effected like in the previous connections, i. e. by condenser bridges, reflection plates or other reflection arrangements mentioned before.

In the circuit of Figure 17 the three control electrodes are conductively connected together, and receive an alternating voltage derived from a high tension source, such as a second winding of the magnet which now must be supplied with alternating current. Again the arc can be supplied with alternating, instead of direct current as shown; in this case it is preferably maintained by high frequency voltage imposed on it. In this way also quasi-optical frequencies can be obtained.

The examples of connection for the valve types $\beta$, $\gamma$, $\delta$ in the following conform to the aforementioned manner of construction $\alpha$. The magnetic field is applied in the two directions like in the aforementioned connections. The tuning is only effected of the three upper wave conductors and corresponds fundamentally to the principles of the aforementioned connections of the valve type. The mode of execution covers the Figures 24 to 27, whereof the two connections Figures 24 and 25 use the secondary emission of the spheres for the purpose of excitation of oscillation in analogy to the connection of Figures 13 and 15.

In the connection Figure 24 the secondary emission produces a falling characteristic between spheres and cathode so that the oscillation process proceeds in analogy to that of connection Figure 13.

In the connection Figure 25 the wave coupling rings of the mode of execution $\beta$ satisfy the same control function to the spherical system as the control rings in Figure 15 do. The oscillation forms itself in the same way as in the connection of Figure 15. The two connections Figures 24 and 25 can also be operated with alternating current for the excitation of frequency bands in a similar way to the aforementioned one. In addition, the connection of Figure 25 shows a typical example for the tunings of shortest wave lengths being effected by a metalically and capacitively coupled reflector, that means coupled with the wave conductors, whereby a standing wave field is produced between the built-in and the external reflector.

The two connections of Figures 26 and 27 are provided for the gas-filled valve type and correspond in their operating manner to the connections of Figures 16 and 17. Tuning examples for shortest wave range are likewise given in this case. The connection Figure 26 shows shiftable rectangular diverging potential conductors to the valve electrodes carrying oscillation energy which are used with the radiation ellipsoid of Figures 36 to 37 explained later on.

The circuit of Figure 27 has a tuning reflector analogous to that of Figure 25; the outer wave conductor, being at the same potential, is connected to it.

The examples of connection of the mode of execution $\gamma$ are represented in the Figures 28 to 31, the secondary emission of the spheres in combination with magnetic fields being used for oscillation generation in the connections 28 to 30 according to the aforementioned manner.

The connection Figure 28 corresponds in its type of operation to the connection of Figure 13 with the difference that in this case the secondary emission emanates from the plates, while the connections of the Figures 29 and 30 are analogous to the potential distributions of the connection 15 for operation with direct or alternating current. In addition, the plates have the function of control electrodes. The oscillation process is assisted by resonance coupling as well as by reflection- and alternate-induction effects of the spherical and plate resonators.

The connection of Figure 31 shows a voltaic-ion-arc connection for the valve type γ and corresponds to the function effect as per connection 16.

Figures 32 to 35 show examples of connection for the valve-type δ.

The type of operation of this kind of construction can likewise be carried back to that of mode of execution α. In all connections the magnetic field is again appliable in the two described directions.

The connection Figure 32 possesses a similar distribution of the operating voltages as Figure 11 and Figure 12 so that the oscillation process is likewise effected in analogous manner.

In the connections Figures 33 and 34 the metallically joined sphere and plate resonators are, for the purpose of oscillation excitation, connected in the type of operation of Figures 13 and 15.

The connection Figure 35 is a voltaic-arc-ion-connection for the excitation of the shortest waves of the quasi-optical spectrum with utilization of the resonance coupling of the oscillation systems through the long wave terms of the ionized filling-gas which are excited to oscillation.

The arrangement of the valve within a reflection device for the oscillation ranges of the centimetre and millimetre wave length range is shown in Figures 36 and 37.

The reflection device consists of a rotation ellipsoid within the one focus of which the oscillation centre of the valve is situated. A reflection of standing waves serving for reaction-coupling of radiation is effected by arranging in the other focus a reflection point variable in position. A dielectric layer free of absorption, of variable thickness or variable dielectric constant, inserted into the radiation field, serves for the adjustment of the reaction-coupling phase. The dielectric layer allows for the adjustment of the phase requisite for reaction-coupling of one part of the oscillation radiation in such a manner that the geometric conditions of the ellipsoid are adapted to the actual wave length by the dielectric layer which shortens the wave lengths. The absorption system to be exposed to the influence of the radiation is either arranged in the second focus of the ellipsoid, or the radiation is carried out by the adjustable opening situated near the second focus and is concentratedly led to the absorption system through a lens system.

Figure 36 shows an example of construction of the radiation ellipsoid. The valve generator 2, the oscillation centre of which is adjusted with gear drive 15 in the focus of the ellipse, is situated in the one focus of the rotation ellipsoid. The sphere reflector 3 is eccentrically fastened to a supporting device of insulating material in the other focus and can be adjusted into the position required for the reaction coupling phase by means of this device. The plates 4 consisting of a suitable dielectric being replaceable by a gap 5 likewise serve for phase tuning of the radiation.

The coils 6 and 7 of an electromagnet deliver the magnetic field for the operation of the valve through the pole pieces 8, 9. The supply of the different operating voltages, for which an example of connection is sketched-in, is effected on that side of the valve which lies outside the ellipsoid. The reflector 10 the form of which is adjusted to that of the rotation ellipsoid, is situated on this side of the valve for the purpose of screening the conduits. The wave conductors 11, 12 are rectangularly curved and are screened against losses by radiation by the shiftable reflection plates 13, 14. The reflection of the oscillation out of the second focus is effected by the adjustable diaphragm 17. The lens body directing the radiation is arranged behind it and is filled with various non-absorbing dielectric liquids. The lock 19 serves for the ellipsoid body which can be unclasped in the centre. The connection piece 20 is provided for the connection of an air cooling device.

Another example for the construction and application of the radiation ellipsoid is given in Figure 37. The arrangement of the valve generator in one focus substantially corresponds to the aforementioned example. In this case, in deviation of Figure 36, the drawing shows a valve type without built-in reflector, to the wave conductor of which the tube resonator system 22 is joined being tuned by means of the shiftable reflection plates 23.

The adjustment of phase of the reaction-coupling of radiation is, in this case, effected by a device allowing for a steady regulation of the thickness of the dielectric layer. The device of phase regulation consists of a cylindrical bowl-system formed by the two glass-plates 24, 25, to the fixed wall 24 of which the glass plate 25 can be approached or removed by means of the gear or screw drive 26. A suitable non-absorbing dielectric liquid serves as filling. This device satisfies, in addition, the function of a cooling-bowl, as the liquid in it is maintained in permanent circulation and on adjustable constant temperature with the assistance of the tube conduit 27 and the cooling- and circulation-drive device 28. Thereby it is achieved that the dielectric constant of the filling liquid, which mostly depends on temperature, always preserves the same value.

The glass-apparatus 29 to 35 serves to bring the substance of liquid or gas to be influenced into the radiation field. The centre of the glass sphere 29 is situated in the second focus of the rotation ellipsoid and is connected to a circulation system through the tube conduit 33, which circulation system, with the assistance of the schematically indicated thermostat 34, regulates the temperature of the liquid or gas to be influenced, while the circulation device 35 causes the entire quantity of substance to be evenly exposed to the influencing radiation. The thermostat 34 is simultaneously developed as high frequency superposing device by means of which a pre-ionization accelerating the process of absorption of the substance to be influenced is effected. The flux and reflux as well as the rotational velocity of the medium absorbing radiation is regulated by the taps 30 to 32. A part of the radiation can be carried out of the rotation ellipsoid through the opening 36, for instance for influencing other absorption devices or a wave-lengths-measuring device 37.

Having now particularly described and ascertained the nature of my said invention, and in what manner the same is to be performed, I declare that what I claim is:

1. A discharge tube for producing oscillations in the quasi-optical wave spectrum, said tube having a plurailty of co-axial electrodes comprising a central ring shaped cathode, spherical electrodes on opposite sides thereof and ring electrodes on opposite sides of said cathode and beyond said spherical electrodes.

2. An arrangement for producing high frequency oscillations comprising a space discharge oscillation generator, means for radiating said oscillations and means for concentrating said oscillations comprising a metallic casing surrounding said oscillation generator and said radiating means, said casing being in the form of an ellipsoid of rotation, said generator and said radiating means being disposed in the opposite foci of said ellipsoid.

3. An arrangement for producing high frequency oscillations comprising a space discharge oscillation generator, means for radiating said oscillations and means for concentrating said oscillations comprising a metallic casing surrounding said oscillation generator and said radiating means, said casing being in the form of an ellipsoid of rotation, said generator and said radiating means being disposed in the opposite foci of said ellipsoid and means disposed between said generator and said radiating means and being adapted by its dielectric constant to affect the tuning of said device.

4. A discharge tube for producing oscillations in the quasi-optical wave spectrum comprising two systems of electrodes, each system comprising a cathode, a ball-shaped electrode and a symmetrically shaped electrode arranged coaxially to the line connecting the centres of said ball-shaped electrodes.

5. A discharge tube for producing oscillations in the quasi-optical wave spectrum comprising two systems of electrodes, each system comprising a cathode, a ball-shaped electrode and a ring-shaped electrode arranged coaxially to the line connecting the centres of said ball-shaped electrodes.

6. A discharge tube for producing oscillations in the quasi-optical wave spectrum comprising two systems of electrodes, each system comprising a cathode, a ball-shaped electrode and a disc-shaped electrode arranged coaxially to the line connecting the centres of said ball-shaped electrodes.

7. A discharge tube for producing oscillations in the quasi-optical wave spectrum comprising two systems of electrodes, each system comprising a ball-shaped electrode, a ring-shaped filament electrode and a symmetrically shaped electrode arranged coaxially to the line connecting the centres of said ball-shaped electrodes, said filament electrodes being arranged parallel to and at opposite sides of the median plane of the tube that is normal to the line connecting the centres of said ball-shaped electrodes and a ring-shaped screen electrode arranged concentrically to and surrounding both said filament electrodes.

8. A discharge tube for producing oscillations in the quasi-optical wave spectrum comprising a cathode, two ball-shaped electrodes arranged at opposite sides of said cathode, respectively, and two symmetrically shaped electrodes arranged at opposite sides of said cathode, respectively, and coaxially to the line connecting the centres of said ball-shaped electrodes.

9. A discharge tube for producing oscillations in the quasi-optical wave spectrum comprising an even number of cathode filaments arranged parallel to each other, means for electrically connecting said filaments to each other and to a heating current supply so as to cause heating currents to flow in said filaments in opposite directions, two ball-shaped electrodes arranged at opposite sides of said cathode filaments, respectively, and two symmetrically shaped electrodes arranged at opposite sides of said cathode filaments, respectively, and coaxially to the line connecting the centres of said ball-shaped electrodes.

10. A discharge tube for producing oscillations in the quasi-optical wave spectrum comprising an annular cathode, an annular screen electrode surrounding said cathode, two ball-shaped electrodes arranged at opposite sides of said cathode, respectively, and two symmetrically shaped electrodes arranged at opposite sides of said cathode, respectively, and coaxially to the line connecting the centres of said ball-shaped electrodes.

11. A discharge tube for producing oscillations in the quasi-optical wave spectrum comprising an annular cathode, an annular screen electrode surrounding said cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, two leads electrically connected to said screen electrode and extending to the outside of the tube at opposite sides thereof, two leads electrically connected to said ball-shaped electrodes, respectively, and extending to the outside of the tube at one side thereof and two leads electrically connected to said symmetrically shaped electrodes, respectively, and extending to the outside of the tube at the other side thereof.

12. A discharge tube for producing oscillations in the quasi-optical wave spectrum comprising a cathode, two ball-shaped electrodes arranged at opposite sides of said cathode, respectively, two leads electrically connected to said electrodes, respectively, and extending to the outside of said tube, each lead comprising a portion arranged in alignment to the line connecting the centres of said electrodes, and two disc-shaped electrodes secured to said portions of said leads, respectively.

13. A discharge tube for producing oscillations in the quasi-optical wave spuctrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, a lead electrically connected to one of said ball-shaped electrodes, a resilient member forming part of said lead and a flexible conductive member connected in shunt to said resilient member.

14. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, and means for adjusting the distance of said ball-shaped electrodes from one another.

15. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, and electrically heated means for adjusting the distance of said ball-shaped electrodes from one another.

16. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, and a bimetallic strip for adjusting the distance of said ball-shaped electrodes from one another.

17. A discharge tube for producing oscillations in the quasi-optical wave spectrum comprising a cathode, two ball-shaped electrodes arranged at opposite sides of said cathode, respectively, and two symmetrically shaped electrodes arranged at opposite sides of said cathode, respectively, and coaxially to the line connecting the centres of said ball-shaped electrodes, said ball-shaped electrodes consisting of refractory and electron emissive material.

18. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, a glass body enclosing said cathode and said electrodes altogether, two cross-squeezes forming part of said body and arranged at opposite sides thereof, and a stabilizing brace consisting at least partly of insulating material, said brace connecting said cross-squeezes to one another.

19. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, a lead electrically connected to one of said electrodes and extending to the outside of the tube and a choke inserted in said lead within the tube.

20. A discharge tube for producing oscillations in the quasi-optical wave spectrum comprising an annular cathode, an annular screen electrode surrounding said cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, two leads electrically connected to said screen electrode and extending to the outside of the tube at opposite sides thereof, two leads electrically connected to said ball-shaped electrodes, respectively, and extending to the outside of the tube at one side thereof, two leads electrically connected to said symmetrically shaped electrodes, respectively, and extending to the outside of the tube at the other side thereof, a wave reflector arranged within the tube at the side of said leads connected to said ball-shaped electrodes, said reflector being electrically connected to one of said leads of said screen electrode, and means for capacitively coupling said reflector to the other leads extending to the side of the tube at which said reflector is arranged.

21. In combination with a tube as claimed in claim 8, means for imparting to said ball-shaped electrodes with regard to said cathode potentials differing from one another and means for imparting to the other electrodes potentials directing the electrons emitted by said cathode to the ball-shaped electrode to which the lower potential is imparted.

22. In combination with a tube as claimed in claim 8, means for imparting to said ball-shaped electrodes with regard to said cathode potentials differing from one another, means for imparting to the other electrodes potentials directing the electrons emitted by said cathode to the ball-shaped electrode to which the lower potential is imparted and means for producing an electromagnetic field imparting a curved path to the electrons emitted by the ball-shaped electrode having the lower potential.

23. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, and an evacuated casing enclosing said cathode and said electrodes altogether.

24. A discharge tube for producing oscillations in the quasi-optical wave spectrum comprising a cathode, two ball-shaped electrodes arranged at opposite sides of said cathode, respectively, two symmetrically shaped electrodes arranged at opposite sides of said cathode, respectively, and coaxially to the line connecting the centres of said ball-shaped electrodes, a casing enclosing said cathode and said electrodes altogether and a gas filling in said casing.

25. In combination with a tube as claimed in claim 8, an impedance arranged outside of said tube for coupling certain of said electrodes with one another.

26. In combination, a tube for producing quasi-optical waves and a metallic hollow casing enclosing at least part of said tube, said casing being in the form of a rotational ellipsoid one focus of which lies within said tube to thereby concentrate the waves produced by said tube at the other focus of said ellipsoid.

27. In combination, a metallic hollow casing in the form of a rotational ellipsoid, a tube for producing quasi-optical waves, said tube being at least partly enclosed by said casing and lying in one focus thereof and means for varying the position of said tube with regard to said casing so as to concentrate the waves produced by said tube at the other focus of said ellipsoid.

28. In combination, a metallic hollow casing in the form of a rotational ellipsoid, a tube for producing quasi-optical waves, said tube being at least partly enclosed by said casing and lying in one focus thereof, a wave conductor connected to said tube and means for varying the position of said tube and said conductor with regard to said casing so as to concentrate the waves produced by said tube at the other focus of said ellipsoid.

29. In combination, a metallic hollow casing in the form of a rotational ellipsoid, a tube for producing quasi-optical waves, said tube being at least partly enclosed by said casing and lying in one focus thereof, a wave conductor connected to said tube, adjustable means insulated from said casing for connecting said tube to a potential supply, reflecting means provided on said adjustable connecting means and arranged at the opposite focus of said casing and means for varying the position of said tube and said conductor with regard to said casing.

30. In combination, a metallic hollow casing in the form of a rotational ellipsoid, a tube for producing quasi-optical waves, said tube being arranged at one focus of said casing and at least partly enclosed by said casing and a radiation reflecting member arranged in said casing at the opposite focus thereof.

31. In combination, a metallic hollow casing in the form of a rotational ellipsoid, a tube for producing quasi-optical waves, said tube being arranged at one focus of said casing and at least partly enclosed by said casing, a radiation reflecting member arranged in said casing at the opposite focus thereof and means for varying the position of said reflecting member with regard to said casing.

32. In combination, a metallic hollow casing in the form of a rotational ellipsoid, a tube for producing quasi-optical waves, said tube being arranged at one focus of said casing and at least partly enclosed by said casing, a radiation reflecting member arranged in said casing at the opposite focus thereof, means for varying the position of said reflecting member with regard to said casing and means arranged outside of said casing for actuating said last means.

33. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid and a layer of dielectric material arranged in a cross-plane of said casing for tuning purposes.

34. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, a layer of dielectric material arranged in a cross-plane of said casing and means for varying the thickness of said layer to control the tuning.

35. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, a layer of dielectric material arranged in a cross-plane of said casing and means for varying the dielectric constant of said layer to control the tuning.

36. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, two parallel plates consisting of a material permeable to the waves produced by said tube, said plates being arranged spaced apart from one another in cross-planes of said casing and a body of a dielectric substance arranged between said plates to control the tuning.

37. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, two parallel plates consisting of a material permeable to the waves produced by said tube, said plates being arranged spaced apart from one another in cross-planes of said casing and means for causing a flow of a dielectric substance between said members to control the tuning.

38. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, two parallel plates consisting of a material permeable to the waves produced by said tube, said plates being arranged spaced apart from one another in cross-planes of said casing, a body of a dielectric substance arranged between said plates and means for adjusting the temperature of said substance to control the tuning.

39. In combination, a metallic hollow casing in the form of a rotational ellipsoid, a tube for producing quasi-optical waves, said tube being at least partly enclosed by said casing and lying in one focus thereof so as to concentrate the waves produced by said tube at the other focus of said ellipsoid, two parallel plates consisting of a material permeable to the waves produced by said tube, said plates being arranged spaced apart from one another in cross-planes of said casing, means for causing a flow of a dielectric substance between said members and means for adjusting the temperature of said substance to control the tuning.

40. In combination, a metallic hollow casing in the form of a rotational ellipsoid, a tube for producing quasi-optical waves, said tube being arranged at one focus of said casing and at least partly enclosed by said casing and a container adapted for the reception of a substance to be treated by the waves produced by said tube, said container being arranged in said casing at the opposite focus thereof.

41. In combination, a metallic hollow casing in the form of a rotational ellipsoid, a tube for producing quasi-optical waves, said tube being arranged at one focus of said casing and at least partly enclosed by said casing, a container adapted for the reception of a substance to be treated by the waves produced by said tube, said container being arranged in said casing at the opposite focus thereof and means for adjusting the position of said container with regard to said casing.

42. In combination, a metallic hollow casing in the form of a rotational ellipsoid, a tube for producing quasi-optical waves, said tube being arranged at one focus of said casing and at least partly enclosed by said casing, a container arranged in said casing at the opposite focus thereof and means for causing through said container a flow of a substance to be treated by the waves produced by said tube.

43. In combination, a metallic hollow casing in the form of a rotational ellipsoid, a tube for producing quasi-optical waves, said tube being arranged at one focus of said casing and at least partly enclosed by said casing, a container arranged in said casing at the opposite focus thereof, means for causing through said container a flow of a substance to be treated by the waves produced by said tube and means for adjusting the temperature of said substance.

44. In combination, a metallic hollow casing in the form of a rotational ellipsoid, a tube for producing quasi-optical waves, said tube being arranged at one focus of said casing and at least partly enclosed by said casing, a container adapted for the reception of a substance to be treated by the waves produced by said tube, said container being arranged in said casing at the opposite focus thereof and additional means for subjecting the substance to an electrical treatment.

45. In combination, a metallic casing in the form of a rotational ellipsoid, a tube for producing quasi-optical waves, said tube being at least partly enclosed by said casing and lying in one focus thereof so as to concentrate the waves produced by said tube at the other focus of said ellipsoid, an opening in said casing near said other focus for the escape of the waves produced by said tube and means for adjusting the size of said opening to control the radiation of said waves.

ERNST EDUARD WILHELM KASSNER.